United States Patent [19]

Fujino et al.

[11] Patent Number: 4,700,186

[45] Date of Patent: Oct. 13, 1987

[54] RADIO WAVE SIGNAL CONTROLLED DOOR LOCK ARRANGEMENT

[75] Inventors: Kiyohiko Fujino; Hirotoshi Namazue; Shigetami Okuya; Shunsaku Tsutsumi; Satoru Kobayashi; Keiichi Shimizu, all of Tokyo, Japan

[73] Assignee: Kokusan Kinzoku Kogyo Co., Ltd., Tokyo, Japan

[21] Appl. No.: 761,881

[22] Filed: Aug. 2, 1985

[51] Int. Cl.[4] ...................... H04Q 9/00; H01H 47/32; H04B 7/00

[52] U.S. Cl. ................................ 340/825.72; 361/172

[58] Field of Search ...................... 340/825.69, 825.31, 340/825.72, 543; 361/172

[56] References Cited

U.S. PATENT DOCUMENTS

| | | | |
|---|---|---|---|
| 4,104,694 | 8/1978 | Hargrove | 340/825.31 |
| 4,143,368 | 3/1979 | Route et al. | 340/543 |
| 4,196,347 | 4/1980 | Hadley | 340/825.31 |
| 4,353,064 | 10/1982 | Stamm | 340/825.69 |
| 4,509,093 | 4/1985 | Stellberger | 340/825.31 |
| 4,568,898 | 2/1986 | Kristy | 340/825.31 |

*Primary Examiner*—Donald J. Yusko

*Attorney, Agent, or Firm*—Fleit, Jacobson, Cohn & Price

[57] ABSTRACT

A radio wave signal control arrangement for a lock mounted on a vehicle door which is controlled on an on-off basis. A portable key signal generator is provided which issues a radio wave instruction signal. A stationary lock controller receives the instruction signal. An actuator is mounted on the vehicle door and is operated by the lock controller when the latter is actuated by reception of the radio wave instruction signal. An outside accessible switch is mounted on the vehicle door, and provides a door-lock state reversing enabling signal to the lock controller to unlock the lock if it is locked or to lock the lock if it is unlocked.

8 Claims, 8 Drawing Figures

RADIO WAVE SIGNAL CONTROLLED DOOR LOCK ARRANGEMENT

FIELD OF THE INVENTION

This invention relates to improvements in or relating to locks. More specifically, it relates to radio wave signal controlled locks, said signal representing a specifically preselected code number. Although not limited, the invention can be utilized for remote controlled door locks, for controlling the doors of automotive vehicles.

DESCRIPTION OF THE PRIOR ART

Various mechanical locks are highly well known. In this case, however, there is such a grave drawback that utilizable number of key codes is highly limited. In addition, the mechanical key operation is highly troublesome.

For avoiding this kind of drawback, electronic locks have already been proposed and commercialized. One of this prior art locks utilizes an array of push buttons. When the operator manipulates these push buttons so as to deliver electronically a predetermined code number correctly, and there is a coincidence thereof with the preset one in a memory, an instruction signal is generated for unlocking the lock. In a modified arrangement, a magnetic card is utilized in place of the button array. The card carries a specifically selected code number. When this card is introduced into a reception opening formed on a vehicle door as an example, an instruction signal is generated for unlocking the door lock.

In these cases, however, any remote control of the door lock can not be brought about.

SUMMARY OF THE INVENTION

A main object of the present invention is to provide a remote control lock wherein radio wave is utilized for unlocking the lock, only when an authorized person has a close access to the lock.

For the attainment of the above object, the inventive radio wave signal control arrangement for a lock mounted on an object to be on-off controlled, may comprise a portable key signal generator adapted for issuing a radio wave instruction signal, a stationary lock controller adapted for receiving said instruction signal; and an actuator for said lock, said arrangement being characterized by that said actuator is mounted on said object and caused to operate by said controller when the latter is actuated by reception of said instruction signal.

In the said arrangement, the said object may be an openable door, preferably a vehicle door. The said signal generator comprises a portable radio wave signal transmitter and a portable central control circuitry connected therewith and said controller comprises a stationary receiver adapted for receiving said instruction signal, a stationary central control circuitry electrically connected therewith and adapted for feeding its operating output to a door lock actuator, said portable transmitter being adapted for transmitting said instruction signal carrying a specifically selected code number and said actuator being caused to operate upon reception of said instruction signal transmitted from an antenna arranged on said object in the form of a vehicle door.

Further, the stationary lock controller may comprise a stationary control circuitry, a stationary receiver connected therewith, and an outswitch (a switch that is accessible from the outside of the door, herein called "outswitch") connected with said circuitry, and said key signal generator comprises a portable receiver adapted for generating an energizing signal upon reception of a signal from said stationary transmitter, and a portable central control circuitry adapted for delivery of an output to said portable transmitter upon reception of said energizing signal from said portable receiver adapted for generating a specifically selected radio wave code signal, said lock control circuitry being adapted for delivery of the actuating output to said door lock actuator only when said outside accessible outswitch has been actuated and when said radio wave code signal from said portable transmitter has been received at said stationary receiver.

The said key signal generator may be a card style electronic circuitry, necessary power source thereof being a solar battery formed into a card and both these cards being united into a single cardboard. In the said arrangement, the said outswitch may preferably be attached to a door handle. In the inventive arrangement, the said lock controller may contain a stationary central control circuitry which is connected with a door lock switch adapted for sensing of locking or unlocking state of the lock, and when an outswitch operatively connected with said control circuitry is actuated on ON, an unlock signal is delivered from the latter, provided that the stationary receiver circuit has received a specifically predetermined code signal from said portable transmitter circuit and the door lock has been kept in locking state, or reversely, a locking signal is delivered from said stationary central control circuitry upon actuation of said outswitch and the door lock has been kept in unlocking state.

In the arrangement, the lock control circuit may preferably be mounted on the panel of a vehicle or the like and electromagnetically shielded towards inside thereof.

Still further, in the arrangement, the said key signal generator is formed into a card which is sandwitched between a solar battery card and an antenna section card.

These and further objects, features and merits of the invention will become more apparent as the description proceeds with reference to the accompanying drawings.

BRIEF DESCRIPTION OF THE DRAWINGS

In the following, preferred embodiments of the present invention will be described in detail with reference to accompanying drawings, in which.

DETAILED DESCRIPTION OF THE EMBODIMENTS

Figure 1:
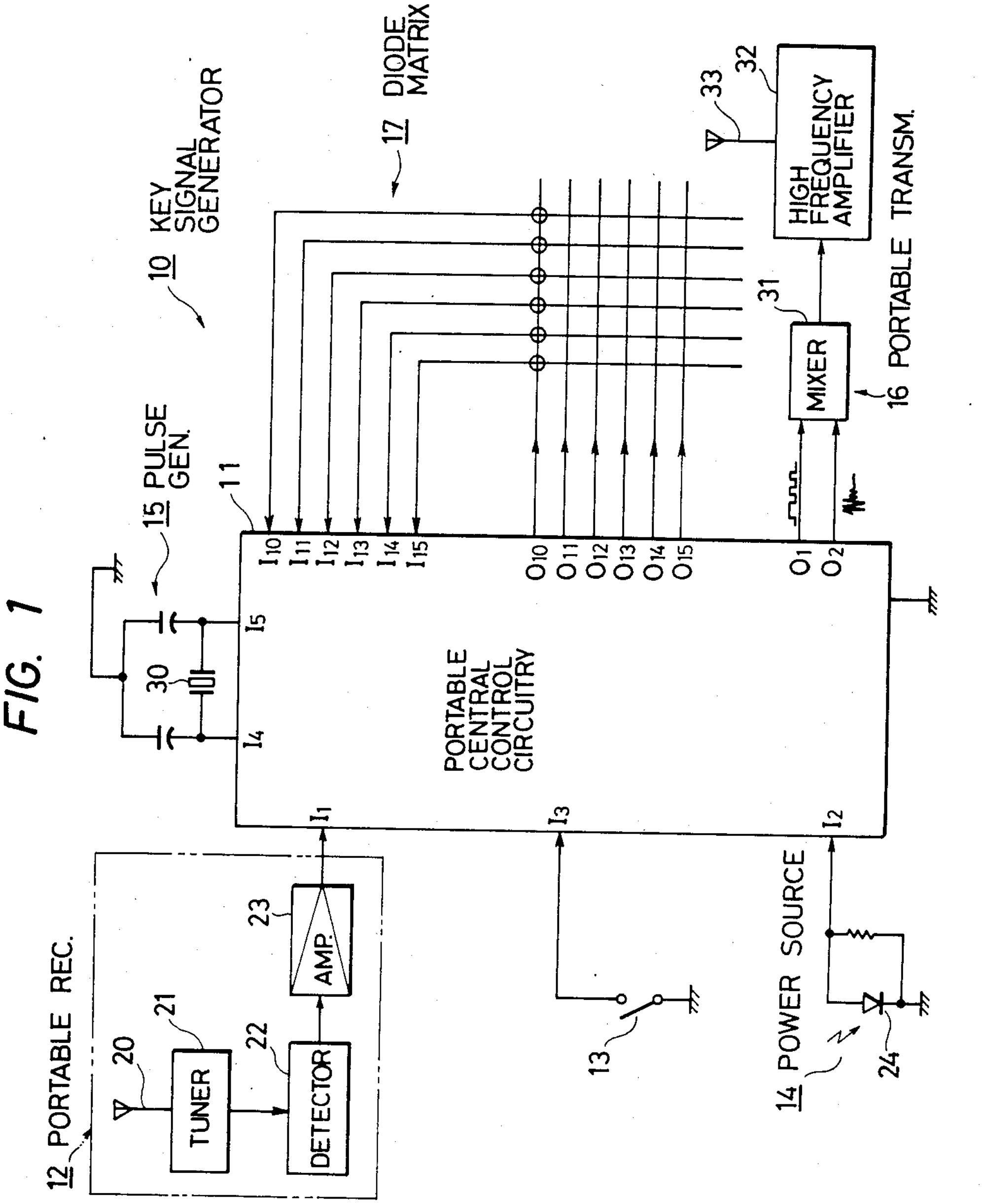
FIG. 1 is a schematic view of a key signal generating circuitry of the radio wave lock according to this invention.

In FIG. 1, numeral 10 represents the key signal generating circuitry as a whole. This key signal generator 10 may be fabricated into a portable one tip or hybrid IC, having, as an example, overall dimensions of 100 mm×50 mm×1 mm. This generator 10 includes a central control circuitry 11 represented only for simplicity as a block which may be, however in practice, fabricated into a microcomputer or CPU.

To the portable central control circuitry 11, a portable receiver circuit 12, a power source circuit 14 and a push button 13 are connected at respective input terminals I1, I2 and I3. Further, a pulse generator circuit 15 is connected to input terminals I4 and I5 of the central control circuitry 11.

A portable transmitter circuit 16 is connected electrically to the circuitry 11 at output terminals 01 and 02. For attributing a specifically selected code number to the signal outgoing from the transmitter 16, diode matrix 17 is connected at inputs I10–I15 and outputs 010 and 015 of the control circuit 11, as shown and only as an example.

Portable receiver circuit 12 receives signal from a lock control circuit to be described and is adapted for providing an energizing or enabling signal to control circuitry 11. The receiver circuitry 12 comprises for this purpose an antenna 20, a tuner 21 electrically connected therewith, a detector 22 adapted for receiving output from the tuner 21, and an amplifier 23 for feeding amplied output of detector 22 to the central control circuitry 11 for energizing or enabling the latter.

If a card-carrying personnel has access to the door or the like object to be locked, and depresses said push button switch 13, an energizing current or an enabling signal will be fed to the control circuitry 11 in place of that fed from said portable receiver circuit. Such arrangement represents, however, a modification of the invention.

Battery 14 may preferably be a solar battery shown however in simplified form of a diode.

Pulse generator 15 comprises as its main constituent a crystal resonator 30.

Portable transmitter 16 comprises a mixer 31 which receives the specifically selected code signal as defined by the diode matrix 17 from an output terminal 02 of the control circuitry 11, as well as a carrier frequency wave from other output terminal 02 thereof. The transmitter 16 further comprises a high frequency amplifier 32 which receives output of said mixer 31 for amplification and transmits the amplified output by an attributed antenna 33.

Figure 4:
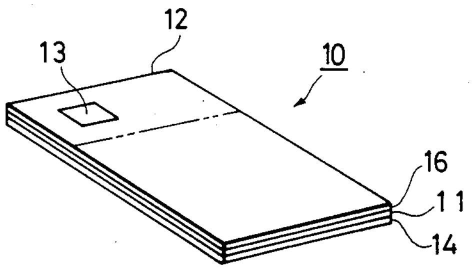
FIG. 4 is a perspective view of a card board which contains the key signal generator.

A practical and preferred hard configuration of said key signal generator 10 is shown at FIG. 4, and indeed, in the form of a portable card board which consists of central control circuitry 11 sandwitched between an upper sheet comprising substantially said transmitter circuit 16 including the antenna 33, the latter being, however, not shown in FIG. 4; and a lower sheet 14 consisting substantially of said power source 14. The upper sheet carries additionally said push button switch 13, as well as said receiver circuit 12 including its antenna 20, not specifically appearing in FIG. 4.

At the key signal generator 10, the code signal wave is generated and transmitted through the antenna 33. This kind of wave transmission may be carried into effect continuously at any time without stoppage. However, the key signal transmission, if desired, may be effected selectively and exclusively either during ON period of push button switch 13, or during reception period of the specifically selected code number signal at the receiver circuit 12.

Next, referring to FIG. 2, the lock control circuitry shown at 110 which has substantially similar design and arrangement as the key signal generating circuitry 10, will be described more in detail.

The lock controller 110 is mounted on the door, of a building or an automotive vehicle not shown, to be on-off controlled according to the invention, or in proximity thereof.

Numeral 111 denotes a stationary central control circuitry which has a similar arrangement as that denoted 11 in the foregoing. Thus, this is a microcomputer or CPU.

A stationary receiver circuit 112 comprises an antenna 120, a tuner 121, a detector 122 and an amplifier 123, designed and arranged in the similar manner as at 20; 21; 22 and 23 in the foregoing; and is connected electrically to an input terminal I101 of the central control circuitry 111.

Numeral 114 represents a power supply line leading to a conventional power supply source, not shown, and connected at its opposite end to input terminal I102 of the central control circuitry 111.

Numeral 115 denotes a pulse generator comprising a crystal resonator 130 and is connected electrically with a pair of terminals I105 and I106 of the central control circuitry 111 as shown.

Numeral 116 denotes a stationary transmitter which is electrically connected with output terminals 0101 and 0102. The transmitter 116 comprises a mixer 131, a high frequency amplifier 132 and an antenna 133.

Numeral 117 denotes a diode matrix similar to that shown by 17 in the foregoing and connected to input terminals I110–I115 and output terminal 0110–0115 of the central control circuitry 111.

The foregoing circuitry 110 and its attributed several circuits shown and described are attached to the object to be on-off controlled, preferably an automotive door or the like. Although the said constituents of the stationary circuitry 110, FIG. 2, are of substantially similar general design and arrangement with those of the foregoing portable circuitry 10, FIG. 1, the respective circuit constants are different therebetween. However, it should be noted that the specifically preselected code number to be used for the both diode matrixes 17 and 117 is one and the same. In addition, it should be further noted that the radio wave signal transmitted by portable transmitter 16 is received at stationary receiver 112, and reversely, the radio wave signal transmitted from 116 is received by portable receiver 12.

Stationary central control circuitry 111 consists of a microcomputer, to which a first door switch 141 fixedly mounted on a door handle, not shown; a second door switch 142 adapted for being automatically operated to ON or OFF with closure of the door; and a door lock switch 143 adapted for sensing locked or unlocked state of the door, are electrically connected at respective input terminals I103; I107 and I104. Further, a power source 114, which is shown only in a simplified way, is also electrically connected to the control circuitry 111 at an input terminal I102 thereof.

Figure 2:
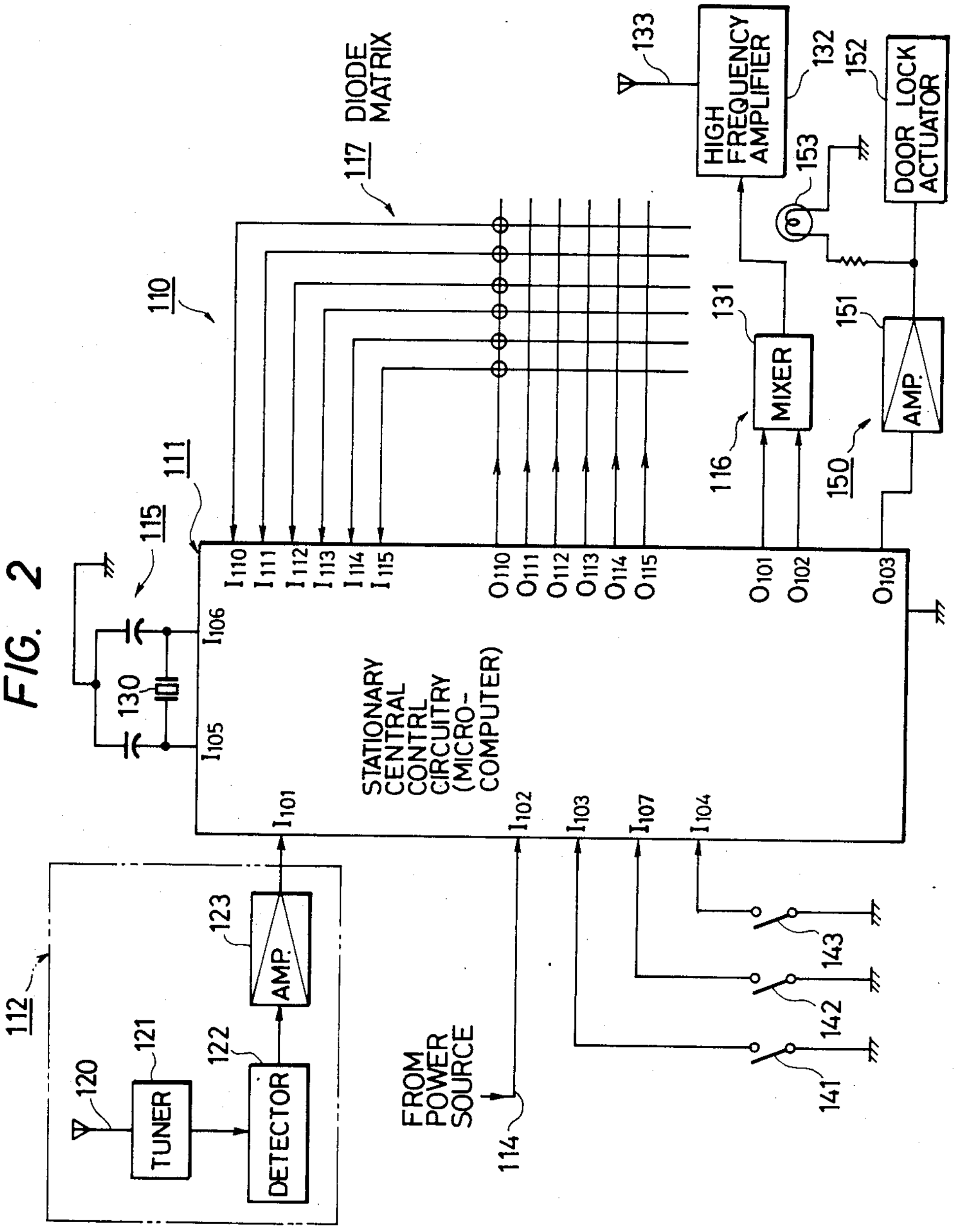
FIG. 2 is a schematic diagram of the lock control circuitry employed.

Output terminal 0103 of the circuitry 111 is connected to a door lock actuator circuit 150 comprising amplifier 151; door lock actuator 152 and indicator lamp 153 which are electrically connected as shown in FIG. 2.

Figure 3:
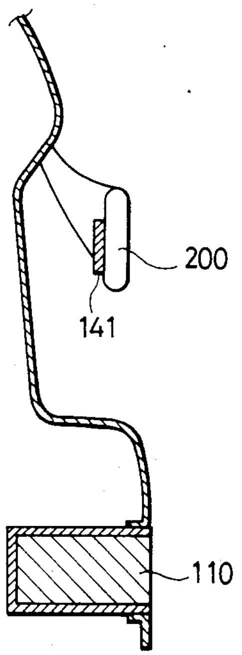
FIG. 3 is a cross-section of the radio wave lock according to this invention, as attached to a part of car body.

Mounting mode of first door switch 141 will clearly be seen from FIG. 3. Numeral 200 represents, by way of example, a conventional outside door handle of an automotive door D which is shown only partially and schematically. The door switch 141 is a push button switch fixedly mounted on the backside of the handle proper. Second door 142 is so designed and constructed that it becomes ON during opening of the door for igniting room lamp(s) of the automotive vehicle.

On the other hand, actuator circuit 150 is so designed and arranged that when door lock actuator 152 is brought into actuation with energization of amplifier 151, the door lock is brought to the locking or unlocking position, as the case may be. The locked position is sensed by door lock switch 143. The actuating power is delivered through said output terminal 0103, when the stationary receiver 112 receives a radio signal corresponding to the specific code number, transmitted from said movable transmitter 16 and the fact is acknowledged by the stationary central control circuitry 111 in such way that the received code is in coincidence with the same preset at diode matrix 117. In this way, the actuator 152 is caused to operate.

The receiver 112 comprises an antena 120; a tuner 121; a detector 122 and an amplifier 123, serially connected one after another. As the antenna, it is preferably a heatable wire embedded in the door handle proper or in a glass case, although not specifically shown. In the former case, the handle proper must at least partially be an insulator.

As may be easily understood from the foregoing, when door switch 142 is ON which means that the door is open, no output power will be delivered from output terminal 0103.

The inventive arrangement acts in four modes as shown in four flow charts of FIGS. 5–8.

With the door lock kept in locking position, door switch 143 is kept at OFF, while it will be at ON under unlocking position. Such ON- or OFF-position is sensed by the conventional door lock sensing means, not shown, comprised in the circuitry 111.

For a certain predetermined period, preferably 10 seconds as an example, the circuitry 111 can not receive the input signal, after a door lock actuation signal was once delivered from output terminal 0103. Only after lapse of such predetermined operation-forbidding period as said above, the state becomes automatically to stop mode. If an authorized person carrying personally the keying signal generator 10 has personal access to the reception antenna 120 fixed on the door handle proper or at its proximity thereof, and indeed, during the above stop mode, a radio wave signal transmitted from moving transmitter 16 is received at antenna 120, thence conveyed to tuner 121, through detector 122 and amplifier 123 to input terminal I101. This signal application is sensed by a code signal sensor, not shown, provided in the stationary central control circuitry 111, which is provided with an energizing period limiter, not shown, arranged to shift from its de-energized state to energized state for a predetermined period, such as 5 seconds as an example.

More specifically, when the card is brought by the personal access to the door key, the stop mode will be turned to the start mode.

During the energizing period, the following check-operation steps will be brought about by the help of the stationary central control circuitry 111, viz:

(1). A possible coincidence between a code signal fed to input terminal I101 and the specifically destined code signal preset by diode matrix 117 is checked.

(2). If the door handle lock switch 141 is OFF or not.

(3). If the door switch 142 is OFF or not.

When the above signal coincidence really exists, the code signal comparator, not shown, in the control circuitry 111 delivers a coincidence signal, and the door lock sensor means (switch 143) delivers a OFF-signal (locked condition), and further the door switch sensor means delivers a OFF-signal (door closed condition), an operation signal for the door lock actuator will be delivered from output terminal 0103 to amplifier 151 and further to actuator proper 152 for a predetermined short period, such as, for example, 2 seconds. Thus, the door lock is brought to the unlocked position.

Upon lapse of 2 seconds of the door lock actuator operating signal period, the stationary central control circuitry 111 is kept de-energized for seven seconds as an example so that any operation signal can not be accepted thereby during the specifically designated short period. Upon lapse of this further pause period, the circuitry 111 will become in stop mode and is ready now for recepting any operation signal.

When the person personally carrying the key signal generator has an access to the antenna 120 during the said ready-for period, a radio wave signal transmitted from the portable transmitter 16 is received at the said antenna, thence to input terminal I101. By this action, the central control circuitry 101 is energized (enabled) for a predetermined short period, a signal comparison job being thereby carried out in the above-mentioned manner. If there should be a signal coincidence, a coincidence signal will be generated at the code signal comparator, and a ON-signal will be issued by the door lock sensor (unlocked condition) via switch 143, while at the same time, a OFF-signal will be generated at the door switch 142 sensor (door closed). At this stage, an actuating signal for the door lock actuator will be delivered through output terminal 0103 for 2 seconds as an example to the actuator proper 152. This energized state is indicated at the lamp 153. Now, the door lock is brought to locked position.

After lapse of said actuating time period of 2 seconds, the circuitry 111 will become de-energized again for 7 seconds, thus being incapable of receiving any coming signal from outside. With the door lock kept in locked position, door lock switch 143 is returned back to stop mode again.

As the door lock actuator proper, a reversible or double-acting solenoid, a reversible motor or a unidirectional step motor, can be used as the case may be. With use of a specifically designed door lock actuator proper, the circuitry 111 may be designed and arranged, the locking or -unlocking operation signal to be fed to the actuator proper may be delivered through other output terminal than that which has been specified by 0103.

When the operator carrying the card has access to antenna 120, thus or even when the operator physically grips the door handle proper, a specifically preset radio wave door lock operation signal is received at reception antenna 120 from the portable antenna 20.

When the output power of the carrier frequency at the key signal generator 10 be rather small, the human body of the operator may act as a direct transmitting medium to the reception antenna 120. In this case, the operator's body will act as a condenser through which a weak high frequency current is transmitted to.

Next, a second embodiment will be described with reference to FIG. 6 together with FIGS. 1 and 2.

In this case, stationary central control circuitry 111 has output terminals 0101 and 0102. The circuitry 111 includes an outswitch (an outside accessible switch) operation sensing means, not specifically shown, leading to input terminal 103 which is connected with outswitch 141. Said output terminals 0101 and 0102 are connected to stationary transmitter, generally shown at 116. Output terminal 0101 is adapted for delivery of other code signal, while output terminal 0102 is adapted for delivery of a carrier frequency wave, so as to modulate the carrier with the code signal at the mixer 131. The mode of modulation may be either of amplitude or of frequency, as is conventionally known.

With the outswitch 141 made ON, the ON-state being sensed at the said sensor, the circuitry 111 is caused to change its state from de-energized to energized (disable to enable) position for a predetermined time period.

Under said energized state of the circuitry 111, the carrier frequency and code signal are delivered from outputs 0101 and 0102, as was explained above, and mixed together at the mixer 131. The modulated signal is amplified at 132 and transmitted from antenna 133.

This radio wave signal is received at antenna 20, thence conveyed through tuner 21, detector 22 and amplifier 23 to portable central control circuitry 11 and sensed by a trigger signal sensor, not shown, contained therein. Upon such sensing operation as above, the code signal and the carrier wave are delivered from output terminals 01 and 02, respectively, for a predetermined time period, and therefore a modulation of the already described kind is brought about in the mixer 31. And the thus modulated signal is amplified at 32, thence radiated from antenna 33.

The thus radiated code signal is received by antenna 120. If the received signal corresponds to the true code signal as was preset, an operation instruction signal for for the actuation of the door lock actuator proper will be delivered from output terminal 0103, thereby the latter being caused to operate.

Figure 5:
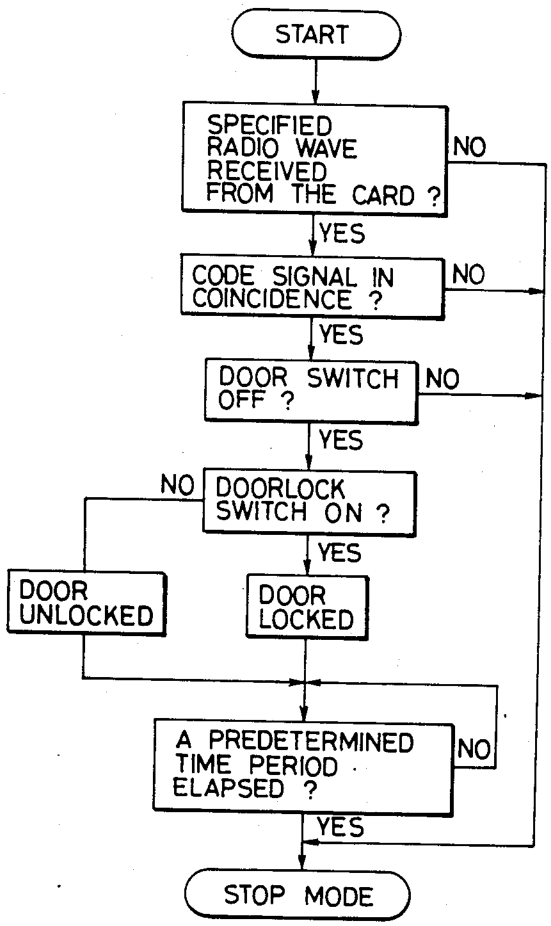
FIGS. 5–8 are flow charts of different operational sequences of several preferred embodiments.
Figure 6:
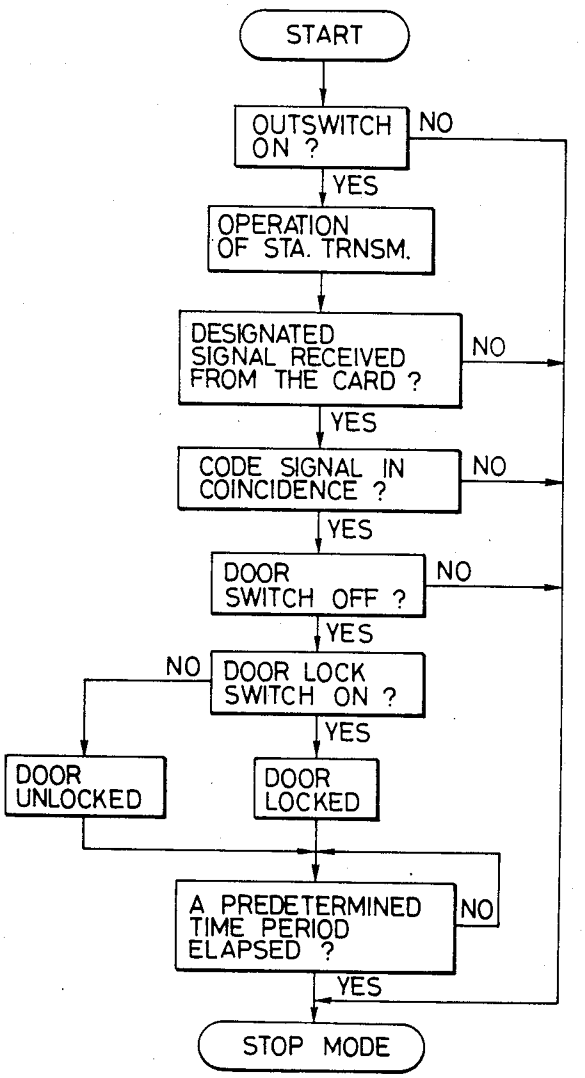
Figure 7:
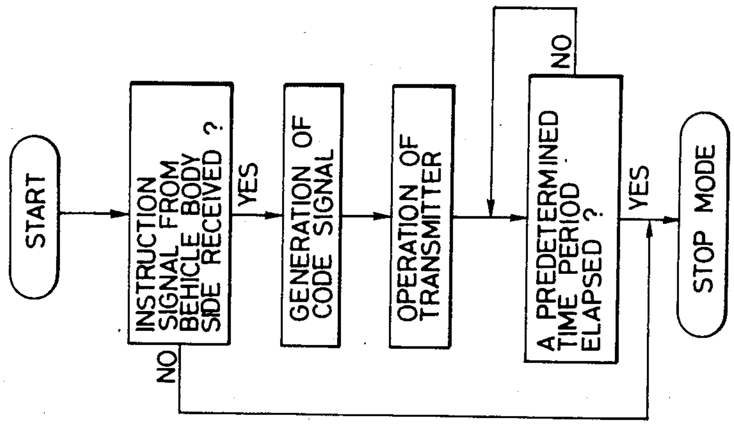

In comparison of two embodiments shown at FIGS. 6 and 7 with that shown in FIG. 5, it should be noted that the outswitch connected with the stationary central control circuitry is operated, so as to deliver a trigger signal of a certain predetermined frequency from the central control circuitry. With reception of this signal at the receiver antenna section of the personally carried card, a code signal is generated and delivered for the execution of a door-locking or unlocking operation, as the case may be. FIG. 6 represents a flow chart concerning the radio wave signal controlled door lock arrangement, while FIG. 7 shows that concerning the card. In the case of the embodiment shown at FIG. 6, when outswitch 141 is made ON (switch closed or actuated), stationary transmitter 116 is brought into actuation and a radio wave signal of predetermined frequency will be delivered from antenna 133 (refer to FIG. 6). When the radio wave is received at portable antenna 12, a radio wave containing the code signal will be radiated for 2 seconds from antenna 33 of the card (FIG. 7) and received at stationary receiver 112. Further operational mode of the door lock in the case of FIG. 6 is same as that of FIG. 5. As for the card side, FIG. 7, the central control circuitry will be kept de-energized for a predetermined period such as 7 seconds upon actuation of portable transmitter 16. During this pause period, it can not receive any instruction signal from the vehicle side. After lapse of such 7 second-pause period, it is kept in stop mode.

Figure 8:
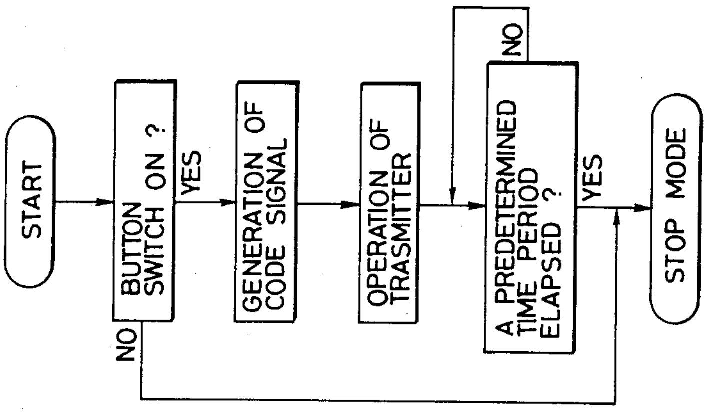

In the final embodiment shown at FIG. 8, push button switch 13 is connected with portable central control circuitry 11. When a push button operation sensor, not shown, contained therein senses the operational state of the switch and an instruction signal wave will be delivered from portable transmitter 16. With reception thereof at stationary receiver 112, the desired unlocking or locking operation is invited.

From the foregoing it will be noted that in the case of the inventive radio wave signal controlled door lock arrangement, when the card adapted for transmitting a radio wave signal including a specifically preselected code signal is brought to a proximity of the receiver antenna of the lock control circuit and the operator carrying personally the card has a physical toutch on the door handle proper by his hand, the door lock proper is brought to its unlocking or locking position, as the case may be, and, indeed, without a troublesome mechanical key operation or personal memory of the code number or the like, a quicker door unlocking job can be performed.

If the stationary receiver 112 is positioned at a certain convenient place of the lock control object such as, most preferably an automotive vehicle body, the receiver must be satisfactorily and magnetically shielded off, lest any radio wave should not be received from the card and, indeed, from inside of the vehicle.

In the similar way, if the door handle proper should be utilized as the antenna section of the stationary receiver 112, the former must be magnetically shielded off from the neighboring metal parts for the same purpose as above.

The embodiments of the invention in which an exclusive property or privilege is claimed are defined as follows:

1. A radio wave signal control arrangement for a lock mounted on a vehicle door to be on-off controlled, said arrangement comprising:

a portable key signal generator adapted for issuing a radio wave instruction signal;

a stationary lock controller adapted for receiving said instruction signal;

an actuator for said lock, said actuator is mounted on said door and caused to operate by said lock controller when the latter is actuated by reception of said instruction signal;

an outside accessible switch means, mounted on said door, for providing a door-lock state reversing enabling signal to said lock controller such that said lock controller unlocks said lock when said lock is previously in a locked state upon actuation of said accessible switch in the presence of said instruction signal, and such that said lock controller locks said lock when said lock is previously in an unlocked state upon actuation of said accessible switch in the presence of said instruction signal.

2. The arrangement of claim 1, wherein said key signal generator comprises a portable radio wave signal transmitter and a portable central control circuitry connected therewith; and said lock controller comprises a stationary receiver adapted for receiving said instruction signal, a stationary central control circuitry electrically connected therewith and adapted for feeding its operating output to said actuator that is a door lock actuator, said portable transmitter being adapted for transmitting said instruction signal carrying a specifically selected code number and said actuator being caused to operate upon reception of said instruction signal received from an antenna arranged on said vehicle door.

3. The arrangement of claim 1, wherein said stationary lock controller comprises a stationary lock control circuitry, a stationary receiver and a stationary transmitter all connected therewith, and said accessible switch is connected with said lock control circuitry; and said key signal generator comprises a portable receiver adapted for generating an enabling signal upon reception of a signal from said stationary transmitter, a portable transmitter and a portable central control circuitry adapted for delivery of an output to said portable transmitter upon reception of said enabling signal from said portable receiver, said portable transmitter adapted for generating a specifically selected radio wave code signal upon receipt of said output, said lock control circuitry being adapted for delivery of the actuating output to said actuator only when said accessible switch has been actuated and when said radio wave code signal from said portable transmitter has been received at said stationary receiver.

4. The arrangement of claim 1, wherein said key signal generator is a card style electronic circuitry, a power source thereof being a solar battery formed into a card and these both cards being united into a single cardboard.

5. The arrangement of claim 3, wherein said accessible switch is attached to an outside door handle.

6. The arrangement of claim 3, wherein said stationary lock controller contains a stationary central control circuitry which is connected with a door lock switch means for sensing of said locked and unlocked state of the lock, and when said accessible switch, operatively connected with said stationary control circuitry, is actuated to ON, an unlock signal is delivered from the stationary control circuitry, provided that the stationary receiver circuit has received a specifically predetermined code signal from said portable transmitter circuit and the door lock is in said locked state, or reversely, a locking signal is delivered from said stationary central control circuitry upon actuation of said accessible switch and when the door lock is in said unlocked state.

7. The arrangement of claim 3, wherein the actuator is a lock control circuit and is mounted on a panel of said vehicle.

8. The arrangement of claim 4, wherein said key signal generator is formed into a card which is sandwiched between the solar battery card and an antenna section card.

* * * * *